United States Patent
Jahns et al.

(10) Patent No.: US 12,502,337 B2
(45) Date of Patent: Dec. 23, 2025

(54) PROCESS FOR PRODUCING A COLORED DENTAL ZIRCONIA ARTICLE

(71) Applicant: SOLVENTUM INTELLECTUAL PROPERTIES COMPANY, Maplewood, MN (US)

(72) Inventors: Michael Jahns, Gilching (DE); Martin Goetzinger, Pflugdorf (DE); Sybille A. Schmittner, Inning (DE)

(73) Assignee: Solventum Intellectual Properties Company, Maplewood, MN (US)

( * ) Notice: Subject to any disclaimer, the term of this patent is extended or adjusted under 35 U.S.C. 154(b) by 1116 days.

(21) Appl. No.: 17/310,668

(22) PCT Filed: Mar. 2, 2020

(86) PCT No.: PCT/IB2020/051757
§ 371 (c)(1),
(2) Date: Aug. 17, 2021

(87) PCT Pub. No.: WO2020/178712
PCT Pub. Date: Sep. 10, 2020

(65) Prior Publication Data
US 2022/0133601 A1    May 5, 2022

(30) Foreign Application Priority Data
Mar. 4, 2019 (EP) .................................... 19160579

(51) Int. Cl.
*A61K 6/818* (2020.01)
*A61K 6/15* (2020.01)
(Continued)

(52) U.S. Cl.
CPC ................ *A61K 6/818* (2020.01); *A61K 6/15* (2020.01); *A61K 6/20* (2020.01); *A61K 6/78* (2020.01);
(Continued)

(58) Field of Classification Search
CPC .......... A61K 6/818; A61K 6/20; A61K 6/842; A61K 6/78; A61K 6/15; A61K 6/833;
(Continued)

(56) References Cited

U.S. PATENT DOCUMENTS 7,691,497 B1    4/2010   Brodkin
7,985,119 B2    7/2011   Basler
(Continued)

FOREIGN PATENT DOCUMENTS

CN    104774007    7/2015
CN    107162603    9/2017
(Continued)

OTHER PUBLICATIONS

International Search report for PCT International Application No. PCT/IB2020/051757 mailed on May 26, 2020, 4 pages.
(Continued)

*Primary Examiner* — Mathieu D Vargot

(57) ABSTRACT

The invention relates to a process of producing a dental zirconia article, the process comprising the step of sintering a porous dental zirconia article, the sintering comprising a heat-treatment segment A characterized by a heating rate of at least 3 K/sec up to a temperature of at least 1,200° C., the porous dental zirconia article being composed of a zirconia material containing 6.0 to 8.0 wt. % yttria, 0.05 to 0.12 wt. % alumina and comprising a coloring component containing Tb, the porous dental zirconia article being essentially free of Fe components. The invention also relates to a process comprising the additional step of applying a glazing composition to the outer surface of the porous zirconia article before the heat-treatment or sintering is conducted.

20 Claims, 1 Drawing Sheet

(51) Int. Cl.
  *A61K 6/20*   (2020.01)
  *A61K 6/78*   (2020.01)
  *A61K 6/833*  (2020.01)
  *A61K 6/842*  (2020.01)
  *C04B 35/488* (2006.01)
  *C04B 38/00*  (2006.01)
  *C04B 41/00*  (2006.01)
  *C04B 41/50*  (2006.01)

(52) U.S. Cl.
  CPC .............. *A61K 6/833* (2020.01); *A61K 6/842* (2020.01); *C04B 35/4885* (2013.01); *C04B 38/0054* (2013.01); *C04B 38/0067* (2013.01); *C04B 41/009* (2013.01); *C04B 41/5022* (2013.01); *C04B 2235/3217* (2013.01); *C04B 2235/3225* (2013.01); *C04B 2235/3246* (2013.01); *C04B 2235/3418* (2013.01); *C04B 2235/612* (2013.01); *C04B 2235/6562* (2013.01); *C04B 2235/661* (2013.01); *C04B 2235/762* (2013.01); *C04B 2235/765* (2013.01); *C04B 2235/785* (2013.01); *C04B 2235/9607* (2013.01); *C04B 2235/9653* (2013.01); *C04B 2235/9661* (2013.01)

(58) Field of Classification Search
  CPC ............ C04B 35/4885; C04B 38/0054; C04B 41/009; C04B 41/5022
  See application file for complete search history.

(56) References Cited

U.S. PATENT DOCUMENTS

| | | |
|---|---|---|
| 8,034,264 B2 | 10/2011 | Ritzberger |
| 8,141,217 B2 | 3/2012 | Gubler |
| 8,178,012 B1 | 5/2012 | Khan |
| 2008/0241551 A1 | 10/2008 | Zhang |
| 2012/0064490 A1 | 3/2012 | Rothbrust |
| 2017/0020639 A1* | 1/2017 | Jahns ................ C04B 35/62605 |
| 2017/0143456 A1 | 5/2017 | Carden |

FOREIGN PATENT DOCUMENTS

| | | | |
|---|---|---|---|
| DE | 20316004 | | 3/2004 |
| DE | 102016214725 | * | 2/2018 |
| EP | 3108849 | | 12/2016 |
| WO | WO 2001-013862 | | 3/2001 |
| WO | WO 2002-045614 | | 6/2002 |
| WO | WO 2017-144644 | | 8/2017 |
| WO | 2017189344 A1 | | 11/2017 |
| WO | WO 2018-029244 | | 2/2018 |
| WO | WO 2018-172544 | | 9/2018 |

OTHER PUBLICATIONS

1507 Extended EP Search Report for E19160579.9, PCT/IB2020/051757, Aug. 20, 2019, 3 pages.

* cited by examiner

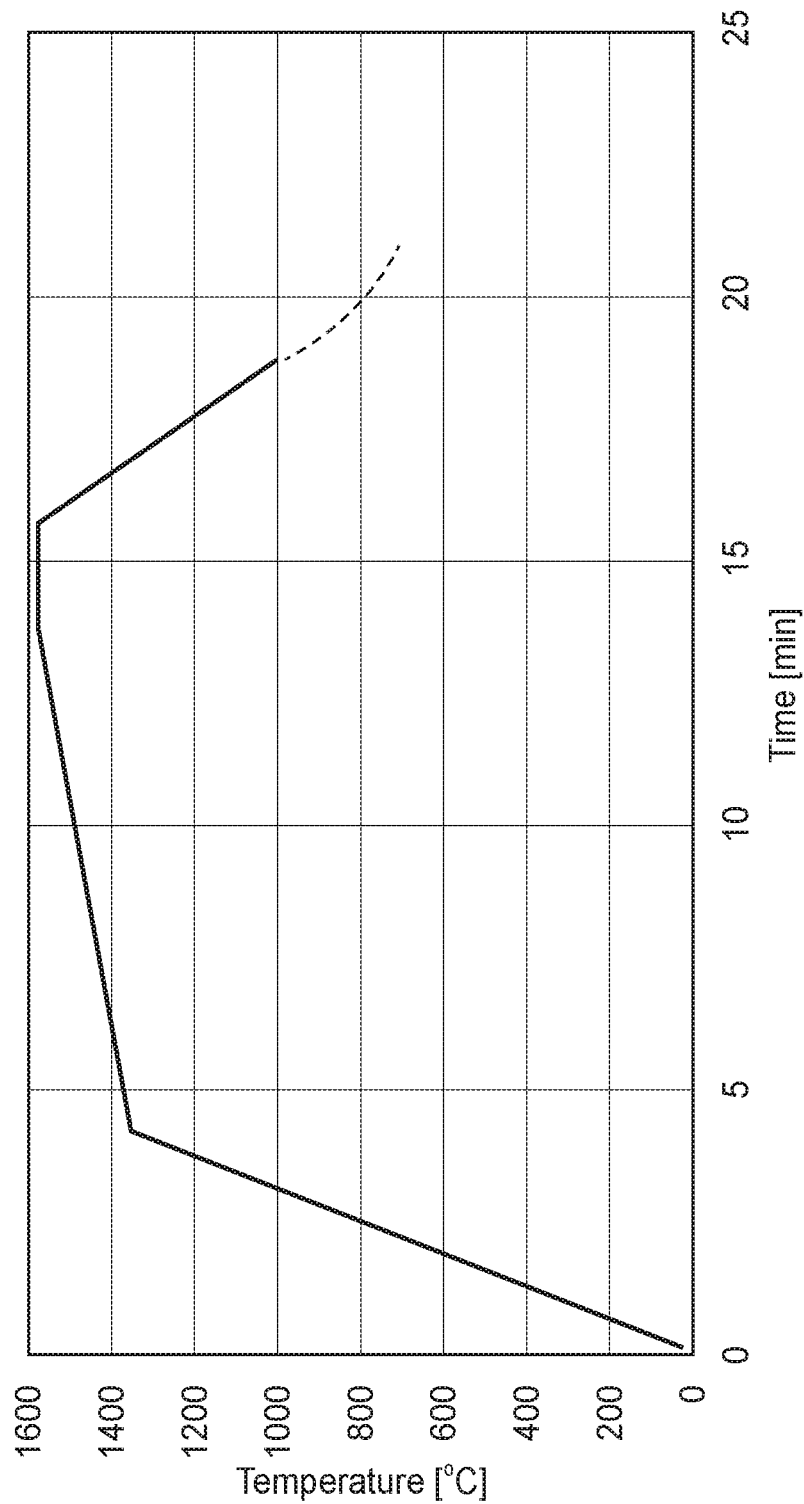

US 12,502,337 B2

PROCESS FOR PRODUCING A COLORED DENTAL ZIRCONIA ARTICLE

CROSS REFERENCE TO RELATED APPLICATIONS

This application is a national stage filing under 35 U.S.C. 371 of PCT/IB2020/051757, filed Mar. 2, 2020, which claims the benefit of European Application No. 19160579.9 filed Mar. 2, 2020, the disclosure of which is incorporated by reference in its/their entirety herein.

FIELD OF THE INVENTION

The invention relates to a process of producing a colored dental zirconia restoration from a porous zirconia article by applying a heat-treatment step with a high heating rate.

The porous dental zirconia article is composed of a zirconia material containing 6.0 to 8.0 wt. % yttria, 0.05 to 0.12 wt. % alumina and comprising a coloring component containing Tb. The porous dental zirconia article is essentially free of Fe components.

BACKGROUND

Currently, dental restorations are typically produced by using one of the following approaches:

One approach is to use an open-pored oxide ceramic, which can be machined in-office or chair-side.

However, after the milling step a time-consuming heat treatment step is needed for obtaining a high strength material. During the heat-treatment step e.g. a glass material is infiltrated into a porous ceramic article to improve the strength of the article.

Such a process is described e.g. in US 2012/0064490 A1 (Rothbrust et al.). The infiltration of the infiltration substance into the pores of the open-pore oxide ceramic is typically done in vacuum and up to a depth of 2 to 90% of the thickness of the open-pore oxide ceramic. An infiltration depth in the range of 0.2 to 0.8 mm is reported.

Similarly, CN 104774007 B (Jinan University) describes a partially permeable, functionally graded zirconia ceramic material, which is infiltrated by a dental glass to obtain a three-layer structure of (1) a glass layer having a thickness of 0.2 mm, (2) a glass-permeated zirconia functionally graded layer having a thickness of 0.3 mm, and (3) a compact zirconia layer having a thickness of 0.5 mm. The glass used for the impregnation process has the composition: $La_2O_3$ 15%, $ZrO_2$ 5%, $Y_2O_3$: 5%, $SiO_2$: 20%, $B_2O_3$: 15%, BaO 15%, $Al_2O_3$: 15%, $TiO_2$: 4%, CaO: 4%, $CeO_2$: 1%, $Fe_2O_3$: 1%.

CN 107162603 A (Aidit Digital Dental Systems) describes a rapid sintering method for a dental zirconium oxide ceramic. The rapid sintering method is characterized in that a sintering furnace with a heating rate of 120° C./min is suggested for sintering a 3 mol % and a 5 mol % Y stabilized zirconium oxide tooth material. Another approach is to grind fully sintered zirconia.

The strength level of fully sintered zirconia is higher compared to the strength of a glass ceramic material. However, the esthetic is sometimes not considered fully satisfying and the grinding itself is time-consuming as well. Further, a glazing or polishing step is typically needed for obtaining the desired esthetic gloss.

Such an approach is described e.g. in US 2017/143456 A1 (Carden et al.), where a fully sintered zirconia material is milled into a dental restoration with a chair-side milling machine. Another approach is to use a pre-sintered zirconia material.

The zirconia dental restoration is made in a dental laboratory by machining a pre-sintered (porous) block to a desired shape, thereby considering the shrinkage of the zirconia material during a later firing process. The firing process to full density typically takes at least 45 minutes.

The pre-sintered zirconia materials are sometimes colored to meet esthetic needs from the practitioner.

In this respect U.S. Pat. No. 8,034,264 B2 (Ritzberger et al.) describes a process of the preparation of blanks and dental shaped parts which contain coloring compounds, wherein the process comprises the step of coating an oxide powder with a coloring substance in a fluidized bed reactor by using a fluid which contains coloring substances and a gaseous carrier medium. As coloring substance a mixture of salts of Pr, Fe, Tb and Mn is suggested.

Similarly, U.S. Pat. No. 8,178,012 B1 (Khan et al.) describes a dental article containing 3-mol % yttria stabilized tetragonal zirconia polycrystalline ceramic and no more than 0.15 wt. % of one or more coloring agents of one or more of Pr, Tb, Cr, Nd, Co, oxides thereof, and combinations thereof.

After the firing step, a second so-called glaze-firing step is typically needed, particularly, if a glossy and highly esthetic dental restoration is desired.

The glazing of zirconia restorations is often recommended to reduce the risk of abrasion of the opposing tooth and because of esthetic reasons.

This is typically done by a lab technician in a dental lab. The lab technician manually applies layers of a glass powder on the surface of the sintered zirconia material and fire both at a much lower temperature compared to the sintering temperature used for sintering the porous zirconia material. The glass powder has typically a melting temperature of less than 900° C.

In the literature processes are described where a type of co-firing of a pre-sintered zirconia material with a glass-ceramic composition is done, particularly to improve the strength of the zirconia material and to avoid fracture problems.

In this respect US 2008/0241551 A1 (Zhang et al.) suggests a method of preparing a functionally graded glass/zirconia/glass sandwich material comprising the steps of a) applying a certain powdered glass-ceramic composition to accessible surfaces of a pre-sintered zirconia substrate, b) infiltrating the glass-ceramic composition into the substrate; and c) densifying the substrate by heating.

In the example section, a heating and cooling rate of 800° C./h is reported. For the overall infiltration and densification process 2 hours are needed. The thickness of the gradient layers is said to be in a range of 60 to 150 µm.

If such a process is applied to porous dental zirconia materials, the resulting article does not meet the requirements of an esthetic dental restoration.

WO 2018/172544 A1 (Ivoclar) describes a method for producing a glazed ceramic article, in which (a) a glaze material is applied to a non-dense-sintered substrate material and (b) the substrate material and the glaze material are subjected to a heat treatment in a temperature range that extends from a first temperature T1 to a second temperature T2, which is higher than the first temperature, to obtain the glazed article, wherein at temperature T1 the glaze material has a viscosity of more than 102.5 Pa*s and at temperature T2 has a viscosity of less than 109 Pa*s.

DESCRIPTION OF THE INVENTION

Independent of the solutions proposed in the prior art, there is a general desire for a process enabling the practitioner to produce zirconia dental restorations chairside, i.e. in a process, which does not require the use of a dental lab.

Particularly, there is a desire for a fast procedure. If possible, the time needed from scanning the dental situation in the mouth of a patient to the fixation of the dental restoration in the mouth of a patient should be below 50 min.

Further, if possible, the process should be easy to perform and reveal predictable results, even if the sintering time is varied.

However, a too fast sintering of a porous zirconia article may negatively influence the esthetic properties of the sintered zirconia article, e.g. the translucency may not be high enough which is mainly determined by the zirconia material used.

The shading or coloring chemistry also needs to be suitable for being used during a fast sintering process. Otherwise, the esthetics may not be adequate in particular regarding color of the sintered ceramic dental article.

Further, if possible, the process should also allow the fast-sintering of a dental ceramic article having a darker tooth color.

Thus, there is a need for a material and process enabling the practitioner to produce esthetic dental restorations within a short period of time.

It can also be desirable to have a material and process at hand which enables the practitioner to perform the sintering and glazing step of the sintered zirconia article within one step, if possible independent from the sintering time. Such a step is typically referred as a co-firing process.

One or more of the above objects are addressed by the invention described in the present text and claims.

In one embodiment the invention features a process of producing a dental zirconia article as described in the present text and claims,
the process comprising the sintering a porous dental zirconia article, the sintering comprising a heat-treatment segment A characterized by a heating rate of at least 3 K/sec up to a temperature of at least 1,200° C., the porous dental zirconia article being composed of a zirconia material containing 6.0 to 8.0 wt. % yttria, 0.05 to 0.12 wt. % alumina and comprising a coloring component containing Tb, preferably in an amount in the range of 0.005 to 0.50 wt. % with respect to the porous dental zirconia article, calculated on the amount of $Tb_4O_7$, the porous dental zirconia article being essentially free of Fe components, the process being.

The invention also relates to a process comprising the additional step of applying a glazing composition to the outer surface of the porous zirconia article before the heat-treatment or sintering is conducted.

The invention is also related to a kit of parts comprising the porous dental zirconia mill blank and the glazing composition described in the present text and claims.

Moreover, the invention features a method of using the porous dental zirconia article as described in the present text and claims for producing a sintered dental zirconia restoration.

Unless defined differently, for this description the following terms shall have the given meaning:

The term "dental article" means any article which is to be used in the dental field, especially for producing a dental restoration, a tooth model and parts thereof.

The dental article has a 3-dimensional inner and outer surface. The surface typically includes convex and concave structures. Compared to other articles such as pottery or paving stones, a dental article is small and filigree. The thickness of the dental article can vary from very thin, e.g. at the edges and rims (below 0.1 mm) to considerably thick, e.g. in the biting area (up to 8 or 16 mm). Sections bridging the crown portions in dental bridges might have a thickness up to 20 mm.

The outer surface typically has an overall convex shape, whereas the inner surface typically has an overall concave shape.

The dental article described in the present text comprises or essentially consists after sintering of a polycrystalline ceramic material comprising yttrium stabilized $ZrO_2$.

Examples of dental articles include crowns (including monolithic crowns), bridges, inlays, onlays, veneers, facings, crown and bridged framework, abutments, orthodontic appliances (e.g. brackets, buccal tubes, cleats and buttons), and parts thereof. The surface of a tooth is not regarded a dental article.

A dental article should not contain components which are detrimental to the patient's health and thus free of hazardous and toxic components being able to migrate out of the dental article.

By "dental mill blank" is meant a solid block (3-dim article) of material from which a dental article, dental workpiece, dental support structure or dental restoration can and typically is to be machined in any subtractive process, e.g. aside from milling also by grinding, drilling etc.

A dental mill blank has a geometrically defined shape and comprises at least one flat surface. A so-called "free form surface" is not regarded as "geometrically defined". In this respect, the shape of a dental restoration (e.g. crown or bridge) itself is not regarded a dental mill blank.

"Zirconia article" shall mean a 3-dimensional article wherein at least one of the x,y,z dimensions is at least 5 mm, the article being composed of at least 80 or at least 90 or at least 95 wt. % zirconia.

"Ceramic" means an inorganic non-metallic material that is produced by application of heat. Ceramics are usually hard, porous and brittle and, in contrast to glasses or glass ceramics, display an essentially purely crystalline structure.

"Crystalline" means a solid composed of atoms arranged in a pattern periodic in three dimensions (i.e., has long range crystal structure as determined by X-ray diffraction). Crystal structures include tetragonal, monoclinic, cubic zirconia and mixtures thereof.

"Monolithic dental restoration" means a dental ceramic article onto the surface of which no facing or veneer has been attached. That is, the monolithic dental restoration is essentially composed of only one material composition. However, if desired, a thin glazing layer can be applied.

"Glass" means an inorganic non-metallic amorphous material which is thermodynamically an under-cooled liquid. Glass refers to a hard, brittle, transparent solid. Typical examples include soda-lime glass and borosilicate glass. A glass is an inorganic product of fusion which has been cooled to a rigid condition without crystallizing. Most glasses contain silica as their main component and a certain amount of glass former and modifier "Glass-ceramic" means an inorganic non-metallic material where one or more crystalline phases are surrounded by a glassy phase so that the material comprises a glass material and a ceramic material in a combination or mixture. It is formed as a glass, and then crystallized by a nucleation and crystallization heat treatment. Glass ceramics may refer to a mixture of lithium-, silicon-, and aluminium-oxides. The porous dental material described in the present text does not contain a glass-ceramic.

A "powder" means a dry, bulk composed of a large number of fine particles that may flow freely when shaken or tilted.

A "particle" means a substance being a solid having a shape which can be geometrically determined. The shape can be regular or irregular. Particles can typically be analysed with respect to e.g. grain size and grain size distribution.

"Density" means the ratio of mass to volume of an object. The unit of density is typically $g/cm^3$. The density of an object can be calculated e.g. by determining its volume (e.g. by calculation or applying the Archimedes principle or method) and measuring its mass.

The volume of a sample can be determined based on the overall outer dimensions of the sample. The density of the sample can be calculated from the measured sample volume and the sample mass. The total volume of the material can be calculated from the mass of the sample and the density of the used material. The total volume of cells in the sample is assumed to be the remainder of the sample volume (100% minus the total volume of material).

A "porous material" refers to a material comprising a partial volume that is formed by voids, pores, or cells in the technical field of ceramics.

The term "calcining" refers to a process of heating a solid material to drive off at least 90 percent by weight of volatile chemically bound components (e.g., organic components) (vs., for example, drying, in which physically bound water is driven off by heating). Calcining is done at a temperature below a temperature needed to conduct a pre-sintering step.

The terms "sintering" or "firing" are used interchangeably. A porous ceramic article shrinks during a sintering step, that is, if an adequate temperature is applied. The sintering temperature to be applied depends on the ceramic material chosen. For $ZrO_2$ based ceramics a typical sintering temperature range is 1,100° C. to 1,550° C. If the sintering is done with high heating-rates, higher temperatures may be required. Sintering typically includes the densification of a porous material to a less porous material (or a material having less cells) having a higher density, in some cases sintering may also include changes of the material phase composition (for example, a partial conversion of an amorphous phase toward a crystalline phase).

A dental zirconia article is classified as "pre-sintered", if the dental zirconia article has been treated with heat (temperature range from 900 to 1,100° C.) for 1 to 3 h to such an extent that the raw breaking resistance of the dental ceramic measured according to the "punch on three ball test" ISO 6872:2015 is within a range of 15 to 55 MPa or 20 to 50 MPa.

A pre-sintered dental ceramic usually has a porous structure and its density (usually 3.0 $g/cm^3$ for an yttrium stabilized zirconia ceramic) is less compared to a completely sintered dental ceramic framework (usually 6.1 $g/cm^3$ for an yttrium stabilized zirconia ceramic).

"Coloring ions" shall mean ions which have an absorption in the spectral range visible to the human eye (e.g. 380 to 780 nm), which results in a colored solution (visible to the human eye), if the coloring ions are dissolved in water (e.g. about 0.6 mol/l) and/or cause a coloring effect in the zirconia article which has been treated with a coloring solution and sintered afterwards. Coloring ions may also be present in the powder before the powder used for producing the zirconia article is compacted.

A "fluorescing agent" shall mean an agent showing fluorescence in the region of visible light (380 to 780 nm).

By "machining" is meant milling, grinding, cutting, carving, or shaping a material by machine. Milling is usually faster and more cost effective than grinding. A "machinable article" is an article having a 3-dimensional shape and having sufficient strength to be machined.

"Ambient conditions" mean the conditions which the inventive solution is usually subjected to during storage and handling. Ambient conditions may, for example, be a pressure of 900 to 1,100 mbar, a temperature of 10 to 40° C. and a relative humidity of 10 to 100%. In the laboratory ambient conditions are adjusted to 20 to 25° C. and 1,000 to 1,025 mbar.

A composition is "essentially or substantially free of" a certain component, if the composition does not contain said component as an essential feature. Thus, said component is not wilfully added to the composition either as such or in combination with other components or ingredient of other components. A composition being essentially free of a certain component usually does not contain that component at all. However, sometimes the presence of a small amount of the said component is not avoidable e.g. due to impurities contained in the raw materials used.

As used herein, "a", "an", "the", "at least one" and "one or more" are used interchangeably. Also herein, the recitations of numerical ranges by endpoints include all numbers subsumed within that range (e.g., 1 to 5 includes 1, 1.5, 2, 2.75, 3, 3.80, 4, 5, etc.).

The terms "comprise" or "contain" and variations thereof do not have a limiting meaning where these terms appear in the description and claims. The term "comprise" shall include also the terms "consist essentially of" and "consist of". "Consisting essentially of" means that specific further components can be present, namely those which do not materially affect the essential characteristic of the article or composition. "Consisting of" means that no further components should be present.

Adding an "(s)" to a term means that the term should include the singular and plural form. E.g. the term "additive (s)" means one additive and more additives (e.g. 2, 3, 4, etc.).

Unless otherwise indicated, all numbers expressing quantities of ingredients, measurement of physical properties such as described below and so forth used in the specification and claims are to be understood as being modified in all instances by the term "about".

"And/or" means one or both. E.g., the expression component A and/or component B refers to a component A alone, component B alone, or to both component A and component B.

BRIEF DESCRIPTION OF FIGURES

FIG. 1 shows an example of a sintering protocol for a porous dental zirconia article.

DETAILED DESCRIPTION

It has been found that the invention described in the text provides a couple of advantages.

For a regular and/or a co-firing process (i.e. the co-firing of a zirconia article together with a glazing composition), a coloring component which does not lead to an undesired discoloration of the sintered zirconia article during the firing process is needed.

It has been found that certain coloring ions may change their oxidation states during the firing process, which may lead to such an undesired discoloration or show other undesired properties.

Especially iron, a standard coloring component for zirconia material, often shows an undesired discoloration.

Using Pr containing coloring components may cause an undesired orange fluorescence of the dental zirconia article.

Using Cr containing coloring components may also lead to an undesired discoloration and may further have a negative impact on the fluorescence of the dental zirconia article.

Terbium, however, does not result in discoloration of zirconia materials during a fast- and/or co-firing process. This finding is essentially independent of the sintering time which is chosen.

Without wishing to be bound to a certain theory, it is assumed that this is not because terbium is more redox stable than iron, but because the alternative oxidation state does not yield an undesired color.

Thus, using terbium as coloring component does not lead to an undesired discoloration, but may only lead to an acceptable variation in shade intensity.

It has also been found that terbium does not prevent fluorescence of a zirconia article containing a fluorescing agent such as bismuth.

Terbium has also been identified as a color component suitable for dental application which can develop the color fast enough for use in a chair-side process (e.g. sintering time within about 20 min).

The speed and intensity of the color development may also depend on the distribution of the terbium component in the zirconia material (fine or coarse) and the composition of the zirconia (especially its yttria and alumina content).

It has been found that the diffusion of terbium ions into the zirconia lattice can be accelerated if the terbium component is used in fine distribution.

A sufficiently fast diffusion of the coloring component within the zirconia material to be sintered is typically desired for fast-firing processes to ensure the development of a homogeneous and stable color within a short time.

Using a coarsely distributed terbium component, although not necessarily leading to discoloration, may result in lighter shades.

As a consequence, dark tooth shades like Vita™ Classic A4 might be more difficult to achieve.

This issue can be addressed if finely distributed terbium is used. Finely distributed terbium can develop a more intense color within a shorter term, e.g. within about 20 min.

Thus, the zirconia material described in the present text containing yttrium in a certain amount in combination with terbium as a coloring component is suited for a fast-firing process as well as a co-firing process. The use of finely distributed terbium is sometimes preferred.

The invention relates to a process of producing a dental zirconia article.

The process comprises the step of sintering a porous dental zirconia article, wherein the sintering comprises one or more heat-treatment segments.

The heat-treatment comprises a heat-treatment segment A which is characterized by a heating rate of at least 3 K/sec up to a temperature of at least 1,200° C.

The heat-treatment segment A is done with a heating rate of at least 3 K/sec or at least 4 K/sec or at least 5 K/sec.

The heating rate should not exceed a rate of 15 K/sec or 12 K/sec or 10 K/sec as this may negatively affect the translucency of the final product.

Typical heating rates are thus within a range of 3 to 15 K/sec or 4 to 12 K/sec.

The heating rate applied during the heat-treatment segment A may vary. Thus, there might be a section where the heating rate is at least 3 K/sec and there might be a section where the heating rate is at least 4 K/sec.

With such heating rates a temperature increase of at least 180 to 240° C./min can be obtained.

Thus, the temperature at which the sintering of the porous dental zirconia article starts can be reached within a time frame of 4 to 8 min.

In contrast to this, sintering processes described in the prior art typically require at least 45 min to reach this temperature.

The heat-treating segment A is typically conducted until a temperature level of 75 to 90% or 80 to 88% of the sintering temperature for the dental zirconia article is reached.

For a zirconia material, the respective temperature is typically in the range of 1,200 to 1,400° C. or 1,250 to 1,350° C.

At this temperature, the sintering has partially started, but the dental zirconia article still contains pores, in particular open pores.

If the first heat-treatment segment is performed to a temperature level above the above-mentioned ranges of the sintering temperature (in ° C.), the resulting dental zirconia article sometimes shows distortions or cracks.

The sintering temperature is the temperature at which the pores (open and closed pores) of the porous zirconia material close under ambient pressure (about 1,013 hPa). If desired, this state can be determined by using a scanning electron microscope (SEM).

A finally sintered zirconia material typically has a density of at least 99% of the theoretical density.

For zirconia articles, the sintering temperature is typically within a range of 1,500 to 1,650° C.

The heat-treatment may further comprise a heat-treatment segment B which is conducted after the heat-treatment segment A.

The heat-treatment segment B is typically conducted at a heating rate which is different from the heating rate of the heat-treatment segment A.

According to one embodiment, the heating rate of the heat-treatment segment B is lower than the heating rate of the heat-treatment segment A.

Heating rates which can be used are typically 2 K/sec (or less) or 1 K/sec (or less).

The heat-treatment segment B is typically done until the sintering temperature of the dental zirconia article is reached.

For a zirconia material, the sintering temperature is typically at least 1,500° C. or at least 1,520° C. or at least 1,550° C.

The sintering temperature is typically not more than 1,650° C. or not more than 1,600° C.

The duration of the heat-treatment segment A and/or B typically depends on the size and dimensions of the porous dental zirconia article to be sintered.

The duration of heat-treatment segment B is typically in a range of 1 to 15 min or 2 to 14 min or 5 to 12 min.

Larger dental articles, in particular dental articles having a wall thickness above e.g. 1.5 mm or bridges with massive pontics typically require more time than smaller articles.

The heat-treatment segment B may be followed by a further heat-treating segment C.

During the heat-treatment segment C, the temperature is typically not increased further, but maintained for a so-called dwell time.

A suitable dwell time is typically 8 min to 1 min or 5 min to 1 min or 3 min to 1 min.

During the heat-treatment segment C, the final sintering takes place and the remaining pores of the dental zirconia article close.

The process may further comprise a cooling-down step.

During the cooling-down step the heat-treated zirconia article is cooled down to room temperature.

During the cool-down segment, the sintered dental zirconia article is cooled down to about 1,000° C. When this temperature is reached, the furnace is opened automatically to cool the sintered dental zirconia to room temperature (23° C.).

The cooling rates can be same as or different from the heating rates mentioned above. Typical cooling rates may be in the range of at least 3 K/sec or at least 4 K/sec or at least 5 K/sec.

An example of a suitable sintering protocol is shown in FIG. 1.

In this example, the sintering protocol contains the following segments:
 a) a first heat-treatment segment A up to a temperature of about 1,350° C., which is reached within about 4 min,
 b) a second heat-treatment segment B up to a temperature of about 1,580° C., which is reached within about 2 min,
 c) a third heat-treatment segment C (dwell time) for about 2 min and
 d) a cool-down segment to a temperature of about 1,000° C., which is reached within about 3 min.

The heat-treatment segments are typically conducted at ambient pressure and in air or sometimes in inert gas (e.g. nitrogen, argon).

The heat-treatment segments and cooling-down segment described above can be compiled to a so-called sintering protocol.

FIG. 1 shows an idealized example of a suitable sintering protocol. As known to the skilled person, due to delays in the control engineering, there might be small temperature deviations (e.g. +/−3%), in particular at the interface between the respective segments.

According to one embodiment, the heat-treatment used for producing a sintered dental zirconia restoration is characterized by the following features alone or in combination:
 heat-treatment segment A: heating rate of 3 to 7 K/sec; duration: 8 min or less;
 heat-treatment segment B: heating rate of 0.2 to 1.0 K/sec or 0.3 to 0.6 K/sec; duration: 25 min or less;
 heat-treatment segment C: heating rate of about 0 K/sec; duration: 8 min or less or 5 min or less or 3 min or less;
 cooling-down segment: cooling rate 3 K/sec or more; duration: 6 min or less.

The overall time needed for heat-treating (comprising the heat-treatment segments A, B and C) and cool-down the dental zirconia article is typically 30 min or less, 25 min or less.

The overall time typically also depends to some extent on the volume of the zirconia article to be sintered. Large articles typically require a longer heat-treating time than smaller articles.

Characterizing the volume of the article to be sintered by fitting the article into an artificial sphere can help to select the appropriate sintering protocol. Such an approach is described in WO 2018/029244 A1 (Sirona).

An oven which can be used for the process described in the present text is commercially available from Dentsply Sirona (SpeedFire™).

A suitable furnace is also described in WO 2017/144644 A1 (Sirona). This furnace is for carrying out a heat treatment of a dental replacement part and comprises an induction coil, a radiant heater, an insulation layer and a furnace chamber. Further, the furnace has a cooling system to control the internal temperature of the furnace chamber.

Generally, useful heat-treating conditions which are applied during the heat-treatment steps can be characterized by the following features alone or in combination:
 a) heating rate: 3 to 7 K/sec or 5 to 7 K/sec;
 b) sintering temperature: at least 1,400° C. or at least 1,450° C. or at least 1,500° C.;
 c) atmosphere: air or inert gas (e.g. nitrogen, argon);
 d) duration: until a density of at least 95 or at least 98 or at least 99% of the final density of the material has been reached;
 e) dwell time: 0 to 10 min or 1 to 5 min;
 f) pressure: ambient pressure.

A combination of the following features is sometimes preferred: a) and b); a), b) and d); a), b), c), d) and e).

The firing temperature and dwell time (that is the time during which the article is kept at that temperature) are often correlated.

A higher temperature typically requires only a short dwell time. Thus, the dwell time, may last from 0 (e.g. if the firing temperature is 1,550° C.) to 10 min (e.g. if the firing temperature is 1,100° C.).

The porous dental zirconia article to be heat-treated is composed of a zirconia material containing 6.0 to 8.0 wt. % yttria and 0.05 to 0.12 wt. % alumina. Suitable materials are sometimes referred to as 4Y-TZP materials (4 mol % yttria equals about 7.1 wt. % yttria).

The wt. % are calculated based on the amount of the respective oxides.

According to one embodiment, the material of the porous dental zirconia mill blank or porous dental zirconia article comprises:
 $ZrO_2$: 88.8 to 93.9 wt. %,
 $HfO_2$: 0 to 3 wt. %,
 $Y_2O_3$: 6.0 to 8.0 wt. %,
 $Al_2O_3$: 0.05 to 0.12 wt. %,
wt. % with respect to the weight of the porous dental zirconia article.

It was found that a higher $Y_2O_3$ content typically leads to an increase of the cubic crystal phase in the zirconia ceramic material after sintering the material to final density. A higher content of the cubic crystal phase may contribute to a better translucency.

It has been found that these materials are particularly useful for producing an aesthetic zirconia restoration in a firing process as described in the present text.

In addition, the presence of a small amount of alumina may be beneficial as it may contribute to a better hydrothermal stability of the zirconia article after sintering. It has also been found that alumina may further help to accelerate the sintering process. Thus, the presence of a small amount of alumina can be beneficial for a fast-sintering process.

However, a too high amount of alumina may have a negative impact on the translucency of the zirconia article after sintering.

Thus, alumina is present in an amount of 0.05 to 0.12 wt. %, or 0.05 to 0.11 wt. % or 0.05 to 0.10 wt. %.

According to a further embodiment, the material of the porous dental zirconia article comprises or essentially consists of or consists of:
$ZrO_2+HfO_2$: 91.38 to 93.94 wt. %;
$Y_2O_3$: 6.0 to 8.0 wt. %;
$Al_2O_3$: 0.05 to 0.12 wt. %;
$Tb_4O_7$: 0.005 to 0.5 wt. %.

According to another embodiment, the material of the porous dental zirconia article comprises or essentially consists of or consists of:
$ZrO_2+HfO_2$: 95.21 to 96.56 mol %;
$Y_2O_3$: 3.37 to 4.55 mol %;
$Al_2O_3$: 0.06 to 0.155 mol %;
$Tb_4O_7$: 0.001 to 0.085 mol %;
converted from wt. % to mol % and calculated with the molecular weights of the oxide compounds given.

According to a further embodiment, the material of the porous dental zirconia article comprises or essentially consists of or consists of:
$ZrO_2+HfO_2$: 91.38 to 93.94 wt. %;
$Y_2O_3$: 6.0 to 8.0 wt. %;
$Al_2O_3$: 0.05 to 0.12 wt. %;
$Tb_4O_7$: 0.008 to 0.4 wt. %.

The material of the porous dental zirconia article does typically not comprise the following components alone or in combination before the firing process with the surface treating agent comprising the glass is conducted: glass or glass ceramic; oxides of Si, Fe, K, Na; in an amount above 1 wt. % with respect to the weight of the material of the porous zirconia dental article.

The presence of these elements may negatively affect the overall performance of the porous dental zirconia article during machining or after sintering the machined articles.

The material of the porous dental zirconia article typically has an average connected pore diameter of 40 to 150 nm.

If desired, the material of the porous dental zirconia article can further be characterized by the following parameters, alone or in combination:
a) BET surface: 5 to 15 $m^2/g$;
b) density: 2.5 to 4 $g/cm^3$;
c) average grain size: 50 to 200 nm.

The combination of features a) and b); a) and c); a), b) and c) is sometimes preferred.

If desired, the material of the porous dental zirconia article can also be characterized by the following parameters, alone or in combination:
a) BET surface: 5.5 to 11 $m^2/g$;
b) density: 2.85 to 3.35 $g/cm^3$;
c) average grain size: 60 to 180 nm or 80 to 160 nm.

The following combination of features is sometimes preferred: a) and b); a) and c); a), b) and c).

The material of the porous dental zirconia article may also be characterized as follows:
a) average connected pore diameter from 40 to 150 nm,
b) density: 2.85 to 3.35 $g/cm^3$;
c) average grain size: 50 to 200 nm.

Using a material with an average connected pore diameter from 40 to 150 nm can be beneficial, because it is comparably easy to produce (e.g. by compacting a powder and conducting a pre-sintering step).

Further, the average connected pore-diameter is in a range which allows the limitation of the interpenetration of the glass during the sintering process to a depth of not more than 5 µm.

With increasing average connected pore diameter, the viscosity of the glass should preferably be adjusted, e.g. a glass with a higher melting behaviour should be used.

Using a porous dental zirconia article, wherein the material has a BET surface in the range specified above was found to be sometimes advantageous, because it ensures an adequate sintering activity of the material before and during the heat-treating process, in particular during the first heat-treating segment having a high heating rate.

An adequate sintering activity can be beneficial for obtaining a zirconia article showing the desired translucency within a short sintering time.

Without wishing to be bound to a certain theory, it is believed that, if the BET surface is too high, there are too many pores in the porous dental zirconia article to be sintered. This might negatively influence the sintering of the article and make it more difficult to achieve a dental zirconia article having adequate strength and/or translucency.

If on the other hand the BET surface is too low, it is believed that the porous zirconia article does not have an adequate sintering activity. This might negatively influence the sintering behaviour (e.g. sintering shrinkage, outgassing of remaining sintering aids) of the porous dental zirconia article during the first heat-treating step.

When referring to the BET surface, the surface of the porous article is meant, not of the powder used for producing the article.

Alternatively, or in addition to the BET surface, the density may also be used for characterizing the material of the porous dental zirconia restoration, because the density is often related to the overall pore volume.

Alternatively, or in addition, the material of the porous dental zirconia article can be characterized by the following parameters alone or in combination:
a) biaxial flexural strength: 15 to 55 MPa determined according to ISO 6872:2015 adapted to measurement in porous state (measurement set up: 3.6 mm punch diameter, 0.1 mm/min load speed, 2 mm sample thickness, support ball diameter 6 mm, 14 mm diameter of supporting balls);
b) Vickers hardness: 15 to 150 (HV 0.5) or 20 to 140 (HV 0.5);
c) coefficient of thermal expansion: $8.5*10^{-6}K^{-1}$ to $11.5*10^{-6} K^{-1}$.

The following combination of features is sometimes preferred: a) and b); a) and c); a), b) and c). If desired, the respective features can be determined as described in the example section.

If the Vickers hardness of the material is too low, the machinability could negatively affect the quality (edge chipping or breaking of the workpiece) as well as in the ease of manual reworking to individualize the frame of a dental restoration or a monolithic restoration.

If the Vickers hardness of the material is too high, the wear of the machining tools may increase and shorten tool life to an unacceptable level or the tool could break and destroy the workpiece.

It was found that, if the biaxial flexural strength of the material is too low, the material may tend to crack during the milling process or during the manual finishing by a dental technician.

On the other hand, if the biaxial flexural strength of the material is too high, the processing of the material by a milling machine is often not possible with reasonable efforts. The milling tool used or the milled material sometimes tend to chip or break. In such a case, the shaping of the material had to be done by grinding, e.g. using a Cerec™ grinding machine (Sirona).

The porous dental zirconia article comprises a coloring component containing Tb.

Using Tb as coloring component facilitates the co-firing of a porous dental zirconia article with a glazing composition on top without discoloration.

Further, using Tb as coloring component does not have a negative impact on the fluorescence properties of a zirconia article which may contain a fluorescing component.

Further, it was found that using coloring components containing Tb in a finely distributed form can be advantageous.

A fine distribution may allow the fast sintering of a porous dental zirconia article to obtain an even more homogeneously colored sintered zirconia article.

It was found that a homogeneously colored sintered zirconia article is obtained essentially independent of the sintering conditions, including fast-sinter conditions.

The finely distributed coloring component containing Tb typically has an average particle size below 100 nm or below 80 nm or below 50 nm.

The coloring component containing Tb is typically present in an amount of 0.005 to 0.70 wt. % or 0.005 to 0.50 wt. % or 0.008 to 0.40 wt. % or 0.01 to 0.3 wt. % with respect to the weight of the porous dental mill blank or porous dental zirconia article calculated on the amount of $Tb_4O_7$ which is present. If the amount of the coloring component is too high, the resulting color might be too intense for dental applications.

The porous dental zirconia article is essentially free of or free of Fe components, i.e. the porous dental zirconia article does not contain wilfully added Fe components.

Besides the coloring component containing Tb, the porous dental zirconia may comprise further coloring component(s).

Further coloring component(s) which can be used comprise or essentially consist of or consist of component(s) containing Mn, Er, Co, Cr, Ni, V, Nd or combinations thereof, in particular selected from the oxides of Mn, Cr, Er, and mixtures thereof (e.g. $MnO_2$, $Cr_2O_3$, $Er_2O_3$). A combination of the oxides of Tb and Mn or Tb and Er or Tb and Cr can sometimes be preferred.

If present, the further coloring component(s) are typically present in an amount of 0.001 to 2 wt. % or 0.005 to 1.5 wt. % or 0.005 to 1.2 wt. % with respect to the weight of the porous dental mill blank or porous dental zirconia article calculated on the amount of the respective oxide which is present Besides coloring component(s) the porous dental zirconia article may comprise fluorescing component(s).

If present, the fluorescing component is typically selected from oxides of Bi and mixtures thereof.

If present, the fluorescing component is typically present in an amount of 0 to 1 wt. % or 0.005 to 0.8 wt. % or 0.01 to 0.1 wt. % with respect to the weight of the porous dental mill blank or porous dental zirconia article calculated on the amount of $Bi_2O_3$.

The porous dental zirconia article to be heat-treated is typically obtained by machining a porous dental zirconia mill blank.

As the porous dental zirconia mill blank is used for producing the porous dental zirconia restoration, the material of the porous dental zirconia mill blank is the same as the material of the porous dental zirconia article.

The porous dental zirconia mill blank has typically the shape of a block or disc.

If the porous dental zirconia mill blank has the shape of a block, the porous zirconia dental mill blank has typically the following dimensions:

x-dimension: 12 to 45 mm, or 15 to 40 mm, y-dimension: 12 to 70 mm, or 15 to 60 mm, z-dimension: 10 to 40 mm, or 15 to 25 mm.

If the porous dental zirconia mill blank has the shape of a disc, the porous dental zirconia mill blank has typically the following dimensions:

x, y-dimension: 90 to 110 mm, or 95 to 105 mm, z-dimension: 5 to 35 mm, or 10 to 30 mm.

Attaching or fixing the dental zirconia mill blank to a machining device, especially to the clamping appliance(s) of such a device, can also be accomplished by providing the blank with suitable means therefore.

Suitable means include frame(s), notch(es), stub(s), mandrels and combinations thereof.

In another embodiment, the dental zirconia mill blank is fixed to or contained in a holding device. The holding device containing the dental mill blank may then function as a means for attaching the blank to a machining device.

Fixing of the dental zirconia mill blank to a holding device can be affected by clamping, gluing, screwing and combinations thereof.

Useful holding devices include frames (open and closed), stubs or mandrels. Using a holding device may facilitate the production of the dental article with a machining device.

Examples of useful holding devices are described in U.S. Pat. No. 8,141,217 B2 (Gubler et al.), WO 02/45614 A1 (ETH Zurich), DE 203 16 004 U1 (Stuehrenberg), U.S. Pat. No. 7,985,119 B2 (Basler et al.) or WO 01/13862 (3M). The content of these documents with respect to the description of the holding device is herewith incorporated by reference.

Generally, the porous zirconia mill blank can be produced by a process comprising the steps of mixing the powders of the respective oxides contained in the material to obtain a powder mixture and pressing the powder mixture.

Mixing of the oxide powders can be achieved by shaking the powders or putting the powders in a mill (e.g. ball mill) and milling the powders until a homogenous powder mixture is obtained.

Further possible mixing equipment can include sieves or granulators. To facilitate the pressing step(s), pressing aids can be added, if desired.

Suitable pressing aids include binders, lubricating additives and mixtures thereof.

If desired, these aids can be added to the zirconia oxide powder being the main component of the powder mixture.

Suitable metal oxide powders are commercially available from various sources including Tosoh Company (Japan).

The powder mixture is then placed in a mould and pressed into the shape of a dental mill blank.

The applied pressure is typically in the range of 150 to 300 MPa. Alternatively, the applied pressure is set so that the pressed ceramic body reaches a certain density, e.g. in the case of zirconia ceramic a density of 2.8 $g/cm^3$ to 3.5 $g/cm^3$.

The article obtained after pressing the powder mixture can be machined or sliced into any desired shape.

If desired, a calcining step can be done.

In a further step, a heat-treatment is applied to the compacted composition to obtain a porous dental zirconia mill blank.

The temperature of the heat treatment is typically in a range of 800 to 1,100° C. or 900 to 1,000° C.

The heat treatment is typically applied for a duration of 30 to 70 hours or 35 to 60 hours.

The porous zirconia dental mill blank is typically provided to the customer in a form allowing the mounting of the dental mill blank in a milling machine.

Either the top or bottom surface of the porous zirconia dental mill blank typically contains a marking element (e.g. printing or carving) which facilitates the correct orientation of the dental mill blank in a milling machine.

The coloring component(s) for the porous dental zirconia article or porous dental zirconia mill blank comprising these coloring component(s) can be added by different means.

According to one embodiment, a porous dental zirconia article or porous dental zirconia mill blank is provided which is treated with a coloring solution comprising a coloring component in dissolved form. Coloring components which can be used include Tb chloride, Tb nitrate, Tb acetate, Tb citrate and mixtures thereof. The use of a solution adds the coloring component to the zirconia in a finely distributed form and can be preferred. Suitable treatment steps include spraying, brushing, dipping and combinations thereof.

According to another embodiment, the coloring component is applied to a zirconia powder by using a coloring solution. The application can be done by using a free-fall reactor or a fluidized-bed reactor. The use of a coloring solution adds the coloring component to the zirconia in a finely distributed form and can be preferred, as well. After the application, the treated zirconia powder is pressed to obtain a porous dental zirconia article or porous dental zirconia mill blank as described above.

According to another embodiment, the coloring component is applied, usually as oxide, via powder mixing to a zirconia powder. The application can be done by any means to mix powders, e.g. a fluidized-bed reactor or free-fall reactor. The size of the coloring oxide particles determines whether the coloring component is finely or coarsely distributed in the zirconia material. Using oxide particles with a diameter of 100 nm or less can be preferred to obtain a fine distribution. After the application, the treated zirconia powder is pressed to obtain a porous dental zirconia article or porous dental zirconia mill blank as described above.

According to a further embodiment, a colored zirconia powder is prepared by co-precipitating zirconia and a coloring component from a solution. This method yields the finest distribution of coloring components in the zirconia from all methods described herein and can be preferred. After the preparation, the zirconia powder is pressed to obtain a porous dental zirconia article or porous dental zirconia mill blank as described above. Processes for the addition of coloring components which yield a fine distribution of the coloring component in the zirconia are typically preferred, especially if the coloring component contains Tb.

If desired, the porous dental zirconia article can also be heat-treated together with a glazing composition.

The co-firing of the porous dental zirconia article together with a glazing composition typically saves time as only one firing step is needed.

The glazing composition contains a glass.

During the heat-treatment step(s), the glass contained in the glazing composition is located on at least a portion of the outer surface of the porous dental zirconia restoration.

The glass and the zirconia material of the porous zirconia restoration are selected such that during the firing step, the glass does not infiltrate the pores of the porous zirconia material to an extent of more than 5 μm or more than 4 μm or more than 3 μm or more than 2 μm or more than 1 μm in depth.

This is in contrast to impregnation procedures suggested in the prior art (e.g. CN 104774007 B), where the impregnation depth is in a range of 0.3 mm (300 μm) or more.

The selection of the porous dental zirconia restoration and the glass suggested in the present text is usually based on material and physical properties of the porous zirconia restoration and the glass. Typical physical properties include viscosity of the glass during the firing step, surface tension of the glass, pore size and sintering behaviour of the porous zirconia material before the firing process is started, and combinations thereof.

The glass contained in the glazing composition can typically be characterized by the following features alone or in combination:
 a) viscosity: at least $10^4$ Pa*s at a temperature range of 1,300° C.;
 b) coefficient of thermal expansion: $1*10^{-6} K^{-1}$ to $10*10^{-6} K^{-1}$ or $2.5*10^{-6} K^{-1}$ to $9*10^{-6} K^{-1}$;
 c) surface tension: of 210 to 300 mN/m at 1,300° C.;
 d) Littleton softening point viscosity at a temperature of 1,100° C. to 1,350° C.;
 e) flow point viscosity at a temperature of 1,300° C. to 1,650° C.

A combination of the following features is sometimes preferred: a) and b); a) and c); a) and d); a) and e); a) and f), a), b) and c), A), b) and d); a), b) and e); a, b), d) and f).

The glass typically has a sufficiently high viscosity at the sintering temperature, so that the glass does not migrate into the pores of the porous zirconia dental article to a degree more than what is desired.

It can be beneficial, if the value of the coefficient of thermal expansion of the glass is smaller than the thermal expansion of the zirconia material. This may help to increase the flexural strength of the final dental restoration and might facilitate the provision of a durable dental restoration. Such an effect can especially be beneficial if the manufactured dental article has the shape of a dental bridge.

The glass can be provided in different shapes, including a powder, paste, coping, facing, or sheet form.

If the glass is provided as a powder, the $D_{50}$ particle size is typically in the range of 1 to 40 μm or 2 to 30 μm. The size of the particles is typically in a range of 0.1 μm to 50 μm or 0.25 μm to 40 μm.

Ideally, the particle size of the glass powder is in a range which allows a homogenous melting of the glass powder during the sintering process of the porous zirconia dental article.

If desired, the particle size can be determined or obtained as described in the example section.

A glass having a viscosity of at least 0.08 MPa*s ($10^{4.9}$ Pa*s) or at least 0.1 MPa*s ($10^5$ Pa*s) or at least 0.2 MPa*s ($10^{5.3}$ Pa*s) or at least 0.5 MPa*s ($10^{5.7}$ Pa*s) at the temperature where the pores of the porous dental zirconia restoration close was found to be particularly useful.

Useful viscosity ranges for the glass include $10^{4.9}$ Pa*s (0.08 MPa*s) to $10^{7.5}$ Pa*s (30 MPa*s) or $10^5$ Pa*s (0.1 MPa*s) to $10^{7.3}$ Pa*s (20 MPa*s) or $10^{5.3}$ Pa*s (0.2 MPa*s) to $10^{7.2}$ Pa*s (15 MPa*s).

If desired, the viscosity of the glass in Pa*s can also be expressed in $\log_{10}$ scale. E.g. a viscosity of 1 MPa*s can also be expressed as $\log_{10}$ (Pa*s) 6 or $10^6$ Pa*s.

For comparison, commercially available glasses which are used for glazing a sintered dental zirconia restoration typically have a viscosity $\log_{10}$ (Pa*s) at 1,300° C. in the range of 2 to 4 or 1.5 to 3.

If desired, the closing of the pores of a porous zirconia article during sintering can be determined by scanning electron microscopy (SEM).

Instead of determining the viscosity of a glass by experiment, it is also possible to calculate the viscosity based on its chemical composition as outlined in the example section. Reliable computer programs are commercially available and widely used (e.g. glass database from SciGlass).

According to one embodiment, the viscosity of the glass is at least $10^{4.9}$ Pa*s or at least $10^5$ Pa*s or at least $10^{5.3}$ Pa*s or at least $10^{5.7}$ Pa*s at a temperature of 1,300° C. for a porous zirconia material having an average connected pore diameter from 40 to 150 nm. E.g. a suitable viscosity range is $\log_{10}$ (Pa*s) 5 to $\log_{10}$ (Pa*s) 7.5.

According to another embodiment, the viscosity of the glass is at least $10^{4.9}$ Pa*s or at least $10^5$ Pa*s or at least $10^{5.3}$ Pa*s at a temperature of 1,300° C. for a porous zirconia material having an average connected pore diameter in the range from 40 nm to less than 90 nm. E.g. a suitable viscosity range is $\log_{10}$ (Pa*s) 5 to $\log_{10}$ (Pa*s) 7.5.

According to another embodiment, the viscosity of the glass is at least $10^6$ Pa*s or at least $10^{63}$ Pa*s or at least $10^{67}$ Pa*s at a temperature of 1,300° C. for a porous zirconia material having an average connected pore diameter in the range from 90 nm to 150 nm. E.g. a suitable viscosity range is $\log_{10}$ (Pa*s) 6 to $\log_{10}$ (Pa*s) 7.5.

The thickness of the infiltration zone is typically within a range of 10 nm to 5 µm or 20 nm to 3 µm or 30 nm to 2 µm.

If desired, the thickness of the infiltration zone can be determined as described in the example section, e.g. by SEM.

If the thickness of the infiltration zone is higher (e.g. above 5 µm), the translucency of the sintered dental zirconia article is often considered to be not acceptable for use as dental restoration.

The glass contained in the glazing composition can be a silica-based glass. The glass may comprise at least 80 mol % $SiO_2$.

The glass may be characterized by comprising the following composition:
$SiO_2$: 80 to 98 mol %,
$B_2O_3$: 2 to 20 mol %;
mol % with respect to the composition of the glass powder.

According to other embodiments, the glass is characterized by comprising or consisting essentially of or consisting of either of the following compositions:

| | | | | | | | |
|---|---|---|---|---|---|---|---|
| $SiO_2$ | 80 to 98 | 80 to 98 | 80 to 98 | 80 to 98 | 80 to 98 | 85 to 98 | 80 to 98 |
| $B_2O_3$ | 0 to 15 | 0 to 15 | 2 to 15 | | | 2 to 15 | |
| $Na_2O$ | 0 to 5 | 0 to 5 | | | | | |
| $K_2O$ | 0 to 5 | 0 to 5 | | 0.1 to 5 | 0.1 to 5 | | 5 to 10 |
| $Al_2O_3$ | 0 to 5 | 0 to 5 | 0.1 to 5 | 0.1 to 5 | 0.1 to 5 | | 8 to 12 |
| $La_2O_3$ | 0 to 1 | 0 to 1 | | | | | |
| MgO | 0 to 5 | 0 to 5 | | 0.1 to 5 | 0.1 to 5 | | |
| CaO | 0 to 2 | 0 to 2 | | | | | |
| SrO | 0 to 2 | 0 to 2 | | | | | |
| BaO | 0 to 2 | 0 to 2 | | | | | |
| $Bi_2O_3$ | 0 to 0.5 | 0 to 0.5 | | | | | |
| $Eu_2O_3$ | 0 to 1 | 0.05 to 1 | | | 0 to 1 | | |

The amounts are given in mol % with respect to the glass composition.

The glass typically does not comprise the following components alone or in combination:
$Li_2O$ in an amount of more than 0.1 mol %;
F in an amount of more than 0.1 mol %;
$P_2O_5$ in an amount of more than 0.1 mol %.

The presence of these components may negatively affect properties like melting behaviour, surface tension, or viscosity of the glass.

The glazing composition may further comprise a liquid for dispersing the glass if the glass is provided as powder.

Thus, the glazing composition may be provided as powder, dispersion or a paste.

The dispersion of the glass powder in a liquid typically facilitates the application of the glass powder to the surface of the porous dental zirconia article.

The nature of the liquid is not particularly limited, unless the desired effect cannot be achieved.

The liquid should have a boiling point allowing the liquid to evaporate during the fast firing process without complications, or during a drying step which is optionally carried out before the firing process is started.

The liquid should not contain components or chemical elements which may cause damage to the sintering furnace used for the fast firing process.

Using liquids which do not contain halogen components (e.g. F, Cl, Br) is sometimes preferred.

The boiling point of the liquid should not be too high. Otherwise the evaporation of the liquid during the firing process might not be sufficiently fast.

The boiling point of the liquid may also be adjusted by using liquids having a suitable molecular weight.

It is beneficial, if the viscosity of the liquid is such that the glass powder can be easily dispersed.

The liquid can typically be characterized by the following features alone or in combination:
molecular weight (Mw): 18 to 1,000 g/mol;
boiling point: 50 to 300° C.;
viscosity: 1 to 2,000 mPa*s or 10 to 1,500 mPa*s or 100 to 1,000 mPa*s (measured at 23° C. at a shear rate of 50 $s^{-1}$).

Mw (substance) is the average molecular weight, if a polymer is used.

Suitable liquids include water and alcohols (including polyalcohols, such as polyethylene glycol) and mixtures thereof.

According to one embodiment, the solvent is water.

According to another embodiment, the solvent is different from water.

The liquid or solvent is typically miscible with water.

Useful liquids include polyol(s) (including polyvinyl alcohol), glycol ether(s) (e.g., PEG 200, PEG 400, PEG 600, diethylene glycol methyl ether, diethylene glycol ethyl ether), alcohol(s) (including 1,2-propanediol, 1,3-propanediol, ethanol, (n- and iso-)propanol, glycerol, glycerol ether, and mixtures thereof.

If a liquid is present, the glass powder to liquid ratio in the glazing composition is typically in a range of 1:1 to 1:15 or 1:2 to 1:12 by weight.

The glazing composition may also contain a colorant.

Adding a colorant can be beneficial to enhance the visibility of the composition during use, especially, if the composition is transparent or of the same color as the zirconia milled restorations.

Thus, the practitioner can easily determine to which parts of the surface of the dental article the composition has already been applied and which parts have not been treated yet and should remain untreated. The colorants, which are typically of organic nature will be burnt out during a later sintering step and thus not be incorporated into the dental article.

Examples of soluble colorants which can be used include Riboflavin (E101), Ponceau 4R (E124), Green S (E142), Patent Blue V (E131).

The glazing composition is typically contained in a receptacle, e.g. a vessel, bottle, or flask. The glazing composition might also be contained in a brush pen, e.g. a container that enables the application of the composition directly out of the container.

The invention also relates to the sintered dental zirconia restoration, obtainable or obtained by the process described in the present text.

The sintered dental zirconia restoration described in the present text has preferably a translucency of 25% or more or 30% or more, if determined on a 1 mm thick sample with a wave length from 400 to 700 nm in reflectance mode.

The sintered dental zirconia restoration obtained or obtainable by the process described in the present text can contain different sections or zones.

The sintered dental zirconia restoration can comprise a glass layer section.

In that case, the glass layer section typically has a layer thickness of 5 to 200 µm or 10 to 150 µm or 20 to 100 µm.

The sintered dental zirconia restoration comprises an intermediate layer section adjacent to the glass layer section.

The intermediate layer section contains a zirconia material section infiltrated by glass.

The intermediate layer section typically has a layer thickness of 0.01 to 5 µm or 0.02 to 4 µm or 0.03 to 3 µm or 0.05 to 2 µm or 0.1 to 1 µm.

The sintered dental zirconia restoration comprises a zirconia material section adjacent to the intermediate layer section.

The zirconia material section is adjacent to the intermediate layer section and does not contain glass. The thickness of the zirconia material section depends on the shape of the dental restoration. The thickness is typically within a range of 0.1 mm to 10 mm or of 0.2 to 8 mm.

The shape of the sintered dental zirconia restoration is not particularly limited.

The sintered dental zirconia article may have the shape of a dental bridge, crown, abutment, or parts thereof.

If the porous dental zirconia article is sintered without a glass, the respective sintered dental zirconia article can typically be characterized by the following features alone or in combination:
- a) density: at least 98.5 (in some embodiments, 99, 99.5, 99.9, or even at least 99.99) percent of theoretical density
- b) biaxial flexural strength: 500 to 1,500 MPa or 800 to 1,400 MPa, determined according to ISO 6872:2015;
- c) phase content tetragonal phase: 20 to 80 wt. % or 30 to 70 wt. % or 40 to 70 wt. %;
- d) phase content cubic phase: 20 to 80 wt. % or 30 to 70 wt. % or 30 to 60 wt. %;
- e) translucency: 25% or more, determined on a sample having a thickness of 1 mm in reflection mode at a wave length of 400 to 700 nm;
- f) being tooth colored.

A combination of the following features is sometimes preferred: a) and b); a) and c); a), d) and e); or a), b), d), e) and f).

According to one embodiment, the dental zirconia article sintered without a glass is characterized by the following features alone or in combination:
- a) density: at least 98.5 percent of theoretical density
- b) biaxial flexural strength: 800 to 1,400 MPa, determined according to ISO 6872:2015;
- c) phase content tetragonal phase: 40 to 70 wt. %;
- d) phase content cubic phase: 30 to 60 wt. %;
- e) translucency: 25% or more, determined on a sample having a thickness of 1 mm in reflection mode at a wave length of 400 to 700 nm.

A combination of the following features is sometimes preferred: a) and b); a) and c); a), d) and e); or a), b), d) and e).

The present invention is also directed to a kit of parts.

The kit of parts described in the present text comprises as separate parts: porous dental zirconia mill blank, glazing composition containing a glass, and optionally liquid for dispersing the glass if provided as powder as described in the present text.

The kit of parts is typically provided to the practitioner with an instruction of use.

The instruction of use contains information for what purpose the kit of parts is intended to be used, how the machining should be done and what sintering conditions should be applied.

If desired, the kit of parts may further comprise one or more of the following items:
sintering aids,
application device for the glazing composition,
optionally a shade guide,
optionally polishing aids,
optionally a sintering oven,
optionally a milling machine.

Sintering aids include e.g. sintering beads and other equipment suitable for mechanically supporting the article to be sintered during the sintering process.

Application devices include e.g. brushes, brush pens, sponges, and spray devices.

As the fast firing process described in the present text is typically done in a short period of time, a sintering oven or furnace should be used which has the capability to provide heating rates up to 7 K/sec.

The invention is also directed to the use of the porous dental zirconia article as described in the present text for producing a sintered dental zirconia restoration.

The process of producing the sintered dental zirconia restoration comprises the step of heat-treating the porous dental zirconia article with a heating rate of at least 3 K/sec up to a temperature of at least 1,200° C. Further heat-treating steps can be applied as appropriate.

The dental zirconia article can have the shape a dental bridge, crown, veneer, facing, abutment, inlay, onlay and parts thereof.

According to one embodiment, the process of producing a dental zirconia article comprises the following steps:
providing a porous dental zirconia mill blank,
machining a porous dental zirconia article from the porous zirconia dental mill blank, the porous zirconia article having an outer and an inner surface,
sintering the porous dental zirconia article, the sintering comprising
a heat-treatment segment A with a heating rate of at least 3 K/sec to a temperature of at least 1,200° C., and a heat-treatment segment B with a heating rate of 0 to 1 K/sec for at least 1 min,
wherein the heat-treatment segment B is conducted after the heat-treatment segment A,
cooling down the heat-treated zirconia article to room temperature,
the dental zirconia article
being composed of a zirconia material containing 6.0 to 8.0 wt. % yttria, 0.05 to 0.12 wt. % alumina and
comprising a coloring component containing Tb and a fluorescing component containing Bi, preferably in an amount of 0.005 to 0.50 wt. % with respect to the porous dental zirconia article calculated on the amount of $Tb_4O_7$, the coloring component containing Tb preferably having a particle size below 100 nm,
the porous dental zirconia article being essentially free of Fe components.

All components used in the dental composition of the invention should be sufficiently biocompatible, that is, the composition should not produce a toxic, injurious, or immunological response in living tissue.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. The above specification, examples and data provide a description of the manufacture and use of the compositions and methods of the invention. The invention is not limited to the embodiments disclosed herein. One skilled in the art will appreciate that many alternative embodiments of the invention can be made without departing from the spirit and scope of thereof.

The following examples are given to illustrate, but not limit, the scope of this invention.

EXAMPLES

Unless otherwise indicated, all parts and percentages are on a weight basis, all water is de-ionized water (DI), and all molecular weights are weight average molecular weight. Moreover, unless otherwise indicated all experiments were conducted at ambient conditions (23° C.; 1013 mbar).
Methods
Elemental Composition
If desired, the elemental composition can be determined by X-ray fluorescence spectrometry (XRF), e.g. with the ZSX Primus II from Rigaku, Japan. This method is especially suited for the analysis of solids, e.g. zirconia ceramics or glass materials.
Fluorescence
If desired, the samples are placed in an UV-light box used for inspection of e.g. thin layer chromatography plates. Fluorescence can be detected by the human eye by the lightening up of the sample against the black background.
BET Surface
If desired, the BET surface of a porous article can be determined as follows: Total pore volume and average pore diameter can be analyzed with the use of $N_2$ sorption isotherms and BET surface area analysis. Samples of around 0.1-2 grams were cut if necessary from larger samples in order to be inserted in to the straight tubes. All samples are degassed in vacuum for more than 1 h at 120° C. before analysis. The samples are then analyzed by adsorption and desorption of $N_2$ gas with a Belsorb II (distributed by Robotherm Präzisionsmesstechnik, Bochum, Germany) in a 9 mm cell with 2 cm bulb and with a 5 mm glass rod. At temperature of liquid nitrogen, absorption data points are collected from 0.1 to 0.99 p/p0 and desorption points collected from 0.99 to 0.5 p/p0. The specific surface area S is calculated by the BET method at p/p0 0.25-0.3 (Details see Chapter 12 regarding calculation see Belsorb Analysis Software User Manual Operating Manual, Chapter 12, Bel Japan. INC).
Particle Size (Suitable for Micro-Sized Particles)
If desired, the particle size distribution including the mean particle size can be determined with a Cilas 1064 (FA. Quantacrome) particle size detection device. During the measurement, ultrasonic can be used to accurately disperse the sample.
Particle Size (Suitable for Nano-Sized Particles, e.g. a Particulate Coloring Component Comprising Terbium for Fine Distribution in Zirconia)
Particle size measurements can be made using a light scattering particle sizer equipped with a red laser having a wavelength of 633 nm (obtained under the trade designation "ZETA SIZER—Nano Series, Model ZEN3600" from Malvern Instruments Inc., Westborough, MA). A solid sample has to be dispersed in a liquid, usually water. For an accurate measurement, a stable dispersion is necessary.
The method of Photon Correlation Spectroscopy (PCS) is used by the instrument software to calculate the particle size. PCS uses the fluctuating light intensity to measure Brownian motion of the particles in the liquid. The particle size is then calculated based on the assumption that the particles are spherical.
Density
If desired, the density of the sintered material can be measured by an Archimedes technique. The measurement is made on a precision balance (identified as "BP221S" from Sartorius AG, Göttingen, Germany) using a density determination kit (identified as "YDK01" from Sartorius AG). In this procedure, the sample is first weighed in air (A), then immersed in water (B). The water is a 0.05 wt. % tenside solution (e.g. "Berol 266, Fa. Hoesch). The density is calculated using the formula $\rho=(A/(A-B)) \rho 0$, where $\rho 0$ is the density of water. The relative density can be calculated by reference to the theoretical density ($\rho t$) of the material, $\rho_{rel}=(\rho/\rho t)100$.
Porosity
If desired, the porosity can be determined as follows: Porosity=(1-(density of porous material/density of sintered material))×100. The density of the porous material can be calculated by the division of weight and volume. Volume can be obtained by geometrical measurements.
Average Grain Size
If desired, the average grain size can be determined with the Line Intercept Analysis. FESEM micrographs with 70,000 times magnification are used for grain size measurement. Three or four micrographs taken from different areas of the sintered body are used for each sample. Ten horizontal lines, which are spaced at roughly equal intervals across the height of each micrograph, are drawn. The numbers of grain boundary intercepts observed on each line are counted and used to calculate the average distance between intercepts. The average distance for each line is multiplied by 1.56 to determine the grain size and this value is averaged over all the lines for all micrographs of each sample.
Biaxial Flexural Strength
If desired, the biaxial flexural strength of pre-sintered material can be determined according to ISO 6872:2015 with the following modifications: The pre-sintered sample is sawn into wafers with a thickness of 2+/−0.1 mm using a dry cut saw. The diameter of the samples should be 17 +/−2 mm. The parallel large faces of the wafer are ground using silicon carbide sand paper (P2500). Each wafer is centred on a support of three steel balls (diameter of the balls 6 mm) with a support diameter of 14 mm. The punch diameter in contact with the wafer is 3.6 mm. The punch is pushed onto the wafer at a rate of 0.1 mm per min. A minimum of 15 samples is measured to determine the average strength. The tests can be conducted in an Instron 5566 universal testing machine (Instron Deutschland GmbH).

Vickers Hardness

If desired, the Vickers hardness can be determined according to ISO 843-4 with the following modifications: The surface of the pre-sintered samples is ground using silicon carbide sand paper (P2500). The surface of the sintered samples is polished with 20 μm diamond suspension. The test forces are adjusted to the hardness level of samples. Used test forces are between 0.2 kg and 2 kg and are applied for 15 s each indentation. A minimum of 10 indentations is measured to determine the average Vickers hardness. The tests can be conducted with a hardness tester Leco M-400-G (Leco Instrumente GmbH).

Method for Measuring Translucency

If desired, the translucency of the ceramic articles can be evaluated with the following procedure: A test piece in the shape of a disc with an approximate thickness of 1±0.05 mm and an area of measurement of at least 10 mm in diameter is provided. For preparation of the test pieces the pre-sintered sample is sawn into wafers with a thickness of approximately 1.3 mm using a dry cut saw. The parallel large faces of the wafer are ground using silicon carbide sand paper (P2500). The ground samples are sintered in an appropriate furnace to a sintered sample with a thickness of 1±0.05 mm. The sintered sample is measured as fired with a spectrophotometer (X-Rite Color i7, Grand Rapids, USA) in reflectance mode against a white and a black background to obtain the opacity (contrast ratio) of the material. The translucency T is calculated according to T=100%−opacity (in percent). Higher values of translucency are indicative of greater transmission of light, and less opacity.

L*a*b* Values

If desired, L*a*b* values can be determined using the same equipment which is used for determining the opacity (contrast ratio) and translucency.

Thickness of Infiltration Zone

If desired, the thickness of the infiltration zone can be determined by scanning electron spectroscopy (SEM). A manually sanded (sandpaper P2500) zirconia disc sample (2 mm thick) is treated with a glazing composition, fired according to the respective sintering protocol and analyzed with a scanning electron microscope Leco M-400-G2.

This technology can also be used for visualizing the closing of the pores during the sintering process.

Materials

TABLE 1

| Name | Description |
| --- | --- |
| ZRO2-A | Bindered zirconia powder |
| | $ZrO_2$ + $HfO_2$: 94.5 wt. % |
| | $Y_2O_3$: 5.25 wt. % (2.93 mol %) |
| | $Al_2O_3$: 0.25 wt. % |
| ZRO2-B | Bindered zirconia powder |
| | $ZrO_2$ + $HfO_2$: 92.8 wt. % |
| | $Y_2O_3$: 7.1 wt. % (4.00 mol %) |
| | $Al_2O_3$: 0.1 wt. % |

TABLE 1-continued

| Name | Description |
| --- | --- |
| ZRO2-C | Bindered zirconia powder |
| | $ZrO_2$ + $HfO_2$: 90.1 wt. % |
| | $Y_2O_3$: 9.8 wt. % (5.60 mol %) |
| | $Al_2O_3$: 0.1 wt. % |
| $ZRO_2$-D(Tb) | Bindered, terbium oxide containing zirconia powder |
| | $ZrO_2$ + $HfO_2$: 92.4 wt. % |
| | $Y_2O_3$: 5.5 wt. % (3.13 mol %) |
| | $Al_2O_3$: 0.1 wt. % |
| | $Tb_4O_7$: 2.0 wt. % |
| Terbium(III) acetate hydrate | Terbium salt for coloring liquid |
| Triammonium citrate | Complexing agent for terbium ions |

General Process of Producing the Tb-Doped Zirconia Powder

ZRO2-D(Tb) was produced by mixing commercially available zirconia powder with terbium oxide powder ($Tb_4O_7$, e.g. from Alfa Aesar with article no. 11207). The amount of terbium oxide powder was 2.0 wt. % of the mixture. Mixing was performed with a lab scale powder mixing device from IKA, Germany. The resulting material contained distinctly visible brown spots of terbium oxide.

General Process of Producing the Porous Dental Zirconia Article Samples were produced by using the above described zirconia materials.

The following steps were applied:

Filling the powder composition in a mould (diameter: 24.9 mm);

Applying pressure (97 kN) to the powder filling;

Demoulding the compacted body;

Applying a heat treatment 960° C. for about 1 hour.

Samples were cut from the heat-treated mill blank samples according to the sample dimensions required for measurements.

General Process of Sintering the Porous Dental Zirconia Article Sinter Protocol-Fast (conducted with a SpeedFire™ furnace from Dentsply Sirona)

RT-400° C.; 3.1° C./s

400° C.-1,350° C.; 5.3° C./s 1,350° C.-1,580° C.; xx° C./s 1,580° C.; yy seconds hold 1,580° C.-1,000° C.; −3.2° C./s The heating rate xx and hold time yy were varied: xx=0.5, 0.4, 0.4; yy=120, 580, 1180, to obtain three sintering cycles with a duration of 20, 30 and 40 minutes respectively.

The two steps up to 1,350° C. are part of heat-treatment section A, the step up to 1,580° C. corresponds to heat-treatment section B, the holding step at 1,580° C. corresponds to heat-treatment section C, followed by a cooling step.

The sintering cycle with a duration of 20 minutes is a fast-firing cycle as described in the present text.

The sintering cycles with a duration of 30 and 40 minutes are less suitable for a time-sensitive chair-side process, but still yield usable dental ceramic articles.

These two cycles are also included in the examples to demonstrate the color-stability of the zirconia article at different sintering durations up to 40 minutes.

Sinter Protocol-Regular (conducted with a HTC 03/16 furnace from Nabertherm)

RT-1,580° C.; 10° C./min; 2 hours hold

Inventive Example 1

(Finely distributed terbium by shading liquid, ZRO2-B)

A coloring liquid containing terbium ions was prepared by mixing 20.115 g DI water, 0.385 g terbium(III)acetate hydrate and 0.500 g triammonium citrate, until a clear solution was obtained. ZRO2-B zirconia was pressed into blocks, pre-sintered and sliced into platelets. The platelets were colored by dipping into the prepared solution for 2 minutes. The platelets were dried for about 2 hours. The platelets were subjected to the Sinter Protocol-Fast (20, 30 and 40 minutes) and to the Sinter Protocol-Regular.

Inventive Example 2

(Coarsely Distributed Terbium by Powder Mixing, ZRO2-B)

ZRO2-B zirconia powder and ZRO2-D(Tb) powder were mixed to obtain a terbium oxide content of 0.1 wt. %. The mixed powder was pressed into blocks, pre-sintered and sliced into platelets. The platelets were subjected to the Sinter Protocol-Fast (20, 30 and 40 minutes) and to the Sinter Protocol-Regular.

Comparative Example 1

(Finely Distributed Terbium by Coloring Liquid, ZRO2-A)

Samples were prepared according to the procedure described in Inventive Example 1. The zirconia material used was ZRO2-A.

Comparative Example 2

(Coarsely Distributed Terbium by Shading Liquid, ZRO2-A)

Samples were prepared according to the procedure described in Inventive Example 2, The zirconia material used was ZRO2-A and ZRO2-D(Tb).

Comparative Example 3

(Finely Distributed Terbium by Coloring Liquid, ZRO2-C)

Samples were prepared according to the procedure described in Inventive Example 1. The zirconia material used was ZRO2-C.

Comparative Example 4

(Coarsely Distributed Terbium by Coloring Liquid, ZRO2-C)

Samples were prepared according to the procedure described in Inventive Example 2. The zirconia material used was ZRO2-C and ZRO2-D(Tb).

The sintered platelets were analyzed for translucency and color with a Color i7 from X-Rite. The results are given in Table 2.

TABLE 2

| | distribution | sinter time [min] | $Tb_4O_7$ content in zirconia material [wt. %] | translucency [b] [%] | b* value |
|---|---|---|---|---|---|
| IE 1.1 | fine | 20 | 0.1 [a] | 28.08 | 35.29 |
| IE 1.2 | fine | 30 | 0.1 [a] | 29.31 | 34.44 |
| IE 1.3 | fine | 40 | 0.1 [a] | 30.25 | 34.49 |
| IE 1.4 | fine | approx. 270 | 0.1 [a] | 27.83 | 39.93 |
| IE 2.1 | coarse | 20 | 0.1 | 28.14 | 33.20 |
| IE 2.2 | coarse | 30 | 0.1 | 29.53 | 32.60 |
| IE 2.3 | coarse | 40 | 0.1 | 28.57 | 32.80 |
| IE 2.4 | coarse | approx. 270 | 0.1 | 28.26 | 38.56 |
| CE 1.1 | fine | 20 | 0.1 [a] | 19.76 | 33.74 |
| CE 1.2 | fine | 30 | 0.1 [a] | 21.29 | 34.91 |
| CE 1.3 | fine | 40 | 0.1 [a] | 21.41 | 33.48 |
| CE 1.4 | fine | approx. 270 | 0.1 [a] | 20.42 | 37.73 |
| CE 2.1 | coarse | 20 | 0.1 | 22.83 | 31.73 |
| CE 2.2 | coarse | 30 | 0.1 | 24.16 | 31.59 |
| CE 2.3 | coarse | 40 | 0.1 | 23.39 | 31.38 |
| CE 2.4 | coarse | approx. 270 | 0.1 | 20.87 | 36.85 |
| CE 3.1 | fine | 20 | 0.1 [a] | 26.69 | 23.05 |
| CE 3.2 | fine | 30 | 0.1 [a] | 28.18 | 22.32 |
| CE 3.3 | fine | 40 | 0.1 [a] | 27.08 | 22.53 |
| CE 3.4 | fine | approx. 270 | 0.1 [a] | 31.89 | 27.24 |
| CE 4.1 | coarse | 20 | 0.1 | 27.04 | 28.81 |
| CE 4.2 | coarse | 30 | 0.1 | 28.18 | 28.49 |
| CE 4.3 | coarse | 40 | 0.1 | 27.41 | 28.50 |
| CE 4.4 | coarse | approx. 270 | 0.1 | 28.16 | 33.64 |

[a] Calculated with 33.0 wt. % Tb in the terbium acetate raw material (according to Certificate of Analysis provided by supplier) and based on a porosity of the zirconia material of 50 vol. % equal to 14.1 wt. % infiltrated by a liquid with a density of 1 g/cm³; in more detail: 21.0 g of coloring liquid contain 0.385 g terbium(III) acetate, equivalent to 0.127 g terbium (33.0 wt. %), equivalent to 0.149 g $Tb_4O_7$; after infiltration, 1 cm³ of porous zirconia contains 0.50 cm³ (50 vol %) zirconia and 0.50 cm³ coloring liquid; 0.50 cm³ of zirconia has a mass of 3.05 g (density of 6.1 g/cm³); 0.50 cm³ of coloring liquid has a mass of 0.50 g (density of 1 g/cm³) =>14.1 wt. % of 3.55 g; 0.50 g of coloring liquid contains 0.00355 g $Tb_4O_7$ => 0.1 wt. % of 3.55 g.

[b] Calculated from the measured opacity (contrast ratio): translucency = 100% − opacity.

Evaluation

The b* values of the color measurements indicate the intensity of the color yellow, imparted to the material by the addition of terbium. In connection with the sintering time, it is a measure for the speed and stability of the color development during the sintering process.

In the Inventive Examples, terbium was used in combination with a zirconia material containing about 7.1 wt. % yttria and 0.1 wt. % alumina. The resulting material showed a beneficial translucency, suited for an esthetic dental application (>25%) and a high b* value (beneficial for achieving darker tooth shades like Vita™ Classic A4 during a fast-firing process).

In the Comparative Examples, terbium was used in combination with two other zirconia materials.

The first material (CE1 and CE2) contained a lower amount of yttria (about 3 mol %) and a higher amount of alumina, the second material (CE3 and CE4) contained a higher amount of yttria (about 5 mol %) and about the same amount of alumina.

In CE1 and CE2, the translucency was too low for an esthetic dental application (<25%), although the b* values might be in an adequate range.

In CE3.1-3 and CE4.1-3 (fast sintering), the translucency was suitable for an esthetic dental application (>25%), but the b* values were significantly lower (b*=22-23; 28-29) compared to the Inventive Examples (IE1.1-3; IE2.1-3), if the Sinter-Protocol Fast was used (b*=34-35; 32-33).

It can also be seen in the examples that finely distributed terbium typically leads to higher b* values compared to coarsely distributed terbium. This can be an additional benefit and may help to achieve dark tooth shades with a fast-firing process.

The data also shows that the b* values are lower for the samples which were subjected to a fast-firing process (IE1.1-

3; IE2.1-3) compared to the samples which were subjected to the regular firing process (IE1.4; IE2.4). This reveals the challenge to obtain sufficiently high b* values during fast-firing.

The invention claimed is:

1. A process of producing a colored dental zirconia article, the process comprising:
applying a glazing composition to an outer surface of a porous dental zirconia article before conducting a heat-treatment segment A, the glazing composition comprising a glass comprising at least 80 mol % $SiO_2$, wherein the amount is given in mol % with respect to the glass; and
sintering the porous dental zirconia article, the sintering comprising:
the heat-treatment segment A with a heating rate of at least 3 K/sec up to a temperature of at least 1,200° C., and
a heat-treatment segment B with a heating rate that is lower than the heating rate of heat-treatment segment A and is conducted after the heat-treatment segment A for at least 1 minute,
wherein the porous dental zirconia article comprises a zirconia material containing 6.0 to 8.0 wt. % yttria, 0.05 to 0.12 wt. % alumina, and a coloring component containing Tb in an amount of 0.005 to 0.70 wt. % with respect to the porous dental zirconia article calculated on the amount of $Tb_4O_7$, and
wherein the porous dental zirconia article is essentially free of Fe components.

2. The process according to claim 1, wherein the porous dental zirconia article comprises at least one of:
an average connected pore diameter of 40 to 150 nm;
a surface area of 5 to 15 $m^2$/g, determined by nitrogen adsorption analysis;
a density of 2.5 to 4 $g/cm^3$;
an average grain size of 50 to 200 nm; or
a coefficient of thermal expansion of $8.5*10^{-6}K^{-1}$ to $11.5*10^{-6}K^{-1}$.

3. The process according to claim 1, wherein the porous dental zirconia article comprises at least one of:
$ZrO_2$ in an amount of 88.8 to 93.9 wt. %,
$HfO_2$ in an amount of 0 to 3 wt. %,
$Y_2O_3$ in an amount of 6.0 to 8.0 wt. %, or
$Al_2O_3$ in an amount of 0.05 to 0.12 wt. %,
each wt. % with respect to a total weight of the porous dental zirconia article.

4. The process according to claim 1, wherein the porous dental zirconia article includes at least one additional coloring component comprising one or more of: Mn, Er, Co, Cr, Ni, V, or Nd.

5. The process according to claim 1, wherein the porous dental zirconia article comprises a fluorescing component.

6. The process according to claim 1, further comprising:
providing a porous dental zirconia mill blank,
machining a porous dental zirconia article from the porous zirconia dental mill blank, the porous dental zirconia article having an outer surface and an inner surface,
sintering the porous dental zirconia article to provide a heat-treated zirconia article, the sintering comprising:
a heat-treatment segment A with a heating rate of at least 3 K/sec to a temperature of at least 1,200° C.,
a heat-treatment segment B with a heating rate of 0 to 1 K/sec for a duration of no more than 10 minutes up to a temperature of at least 1,300° C., and
optionally, a heat-treatment segment C with a heating rate of 0 K/sec for at least 1 min, wherein the optional heat-treatment segment C is conducted after the heat-treatment segment B; and
cooling down the heat-treated zirconia article to room temperature,
wherein the porous dental zirconia article comprises the coloring component in an amount of 0.005 to 0.50 wt. % with respect to the porous dental zirconia article calculated on the amount of $Tb_4O_7$.

7. The process according to claim 1, wherein the glazing composition comprises a glass comprising at least one of the following compositions:
i) Composition 1:
$SiO_2$: 80 to 98 mol %
$B_2O_3$: 0 to 15 mol %
$Na_2O$: 0 to 5 mol %
$K_2O$: 0 to 5 mol %
$Al_2O_3$: 0 to 5 mol %
$La_2O_3$: 0 to 1 mol %
MgO: 0 to 5 mol %
CaO: 0 to 2 mol %
SrO: 0 to 2 mol %
BaO: 0 to 2 mol %
$Bi_2O_3$: 0 to 0.5 mol %
$Eu_2O_3$: 0 to 1 mol %
ii) Composition 2:
$SiO_2$: 80 to 98 mol %
$B_2O_3$: 0 to 15 mol %
$Na_2O$: 0 to 5 mol %
$K_2O$: 0 to 5 mol %
$Al_2O_3$: 0 to 5 mol %
$La_2O_3$: 0 to 1 mol %
MgO: 0 to 5 mol %
CaO: 0 to 2 mol %
SrO: 0 to 2 mol %
BaO: 0 to 2 mol %
$Bi_2O_3$: 0 to 0.5 mol %
$Eu_2O_3$: 0.05 to 1 mol %
iii) Composition 3:
$SiO_2$: 80 to 98 mol %
$B_2O_3$: 2 to 15 mol %
$Al_2O_3$: 0.1 to 5 mol %
iv) Composition 4:
$SiO_2$: 80 to 98 mol %
$K_2O$: 0.1 to 5 mol %
$Al_2O_3$: 0.1 to 5 mol %
MgO: 0.1 to 5 mol %
v) Composition 5:
$SiO_2$: 80 to 98 mol %
$K_2O$: 0.1 to 5 mol %
$Al_2O_3$: 0.1 to 5 mol %
MgO: 0.1 to 5 mol %
$Eu_2O_3$: 0 to 1 mol %
vi) Composition 6:
$SiO_2$: 85 to 98 mol %
$B_2O_3$: 2 to 15 mol %
vii) Composition 7:
$SiO_2$: 80 to 98 mol %
$K_2O$: 5 to 10 mol %
$Al_2O_3$: 8 to 12 mol %
wherein the amounts are given in mol % with respect to the glass.

8. The process according to claim 1, wherein the glazing composition comprises a glass comprising at least one of:
a viscosity of at least $10^4$ Pa*s at a temperature range of 1,300° C.;

a coefficient of thermal expansion of $1*10^{-6}K^{-1}$ to $10*10^{-6}K^{-1}$;
a surface tension of 210 to 300 mN/m at 1,300° C.;
a Littleton softening point viscosity at a temperature of 1,100° C. to 1,350° C.; or
a flow point viscosity at a temperature of 1,300° C. to 1,650° C.

9. The process according to claim 1, wherein the porous dental zirconia article, after sintering, comprises at least one of:
a density of at least 98.5% of the corresponding theoretical density;
a biaxial flexural strength of 500 to 1,500 MPa, determined according to ISO 6872:2015;
a phase content of tetragonal phase of 20 to 80 wt. %;
a phase content of cubic phase of 20 to 80 wt. %; or
a translucency of 25% or more, determined on a sample having a thickness of 1 mm in reflection mode at a wavelength of 400 to 700 nm.

10. The process according to claim 1, wherein the porous dental zirconia article comprises a shape of at least one of: a dental bridge, crown, veneer, facing, abutment, inlay, onlay, or parts thereof.

11. The process according to claim 1, further comprising:
utilizing the porous dental zirconia article to produce a sintered dental zirconia restoration, the process of producing the sintered dental zirconia restoration comprising heat-treating the porous dental zirconia article with the glazing composition located on the outer surface of the porous dental zirconia article, wherein the glazing composition comprises the glass in combination with a liquid.

12. The process according to claim 1, wherein the porous dental zirconia article comprises:
Zr oxide calculated as $ZrO_2$: from about 88.8 to about 93.9 wt. %,
Y oxide calculated as $Y_2O_3$: from about 6.0 to about 8.0 wt. %,
Al oxide calculated as $Al_2O_3$: from about 0.05 to about 0.12 wt. %, or
Tb oxide calculated as $Tb_2O_3$: from about 0.01 to about 0.50 wt. %,
wt. % with respect to a weight of the porous dental zirconia article.

13. The process according to claim 1, wherein the coloring component containing Tb is incorporated into the zirconia material by co-precipitation of zirconia and the coloring component from a solution.

14. The process according to claim 1, wherein the porous dental zirconia article further comprises
a fluorescing component selected from oxides of Bi, present in an amount of 0.005 to 0.50 wt. % with respect to the weight of the porous dental zirconia article calculated on the amount of $Bi_2O_3$.

15. The process according to claim 1, wherein the coloring component is uniformly distributed within the zirconia material using a fluidized-bed reactor.

16. A process of producing a colored dental zirconia article, the process comprising:
providing a porous dental zirconia article, the porous dental zirconia article comprising a zirconia material containing 6.0 to 8.0 wt. % yttria, 0.05 to 0.12 wt. % alumina, and a coloring component containing Tb in an amount of 0.005 to 0.70 wt. % with respect to the porous dental zirconia article calculated on the amount of $Tb_4O_7$, the coloring component being uniformly distributed within the zirconia material,
applying a glazing composition to an outer surface of the porous dental zirconia article before conducting a heat-treatment segment A, the glazing composition comprising a silica-based glass having at least 80 mol % $SiO_2$, wherein the amounts are given in mol % with respect to the silica-based glass;
sintering the porous dental zirconia article, the sintering comprising:
the heat-treatment segment A with a heating rate of at least 3 K/sec up to a temperature of at least 1,200° C., and
a heat-treatment segment B with a heating rate that is lower than the heating rate of heat-treatment segment A and is conducted after the heat-treatment segment A for a duration of no more than 10 minutes, up to a temperature of at least 1,300° C.,
wherein the porous dental zirconia article is essentially free of Fe components.

17. The process according to claim 16, wherein the porous dental zirconia article comprises at least one of: an average grain size of 50 to 200 nm, or an average connected pore diameter of 40 to 150 nm.

18. The process according to claim 16, wherein the heat-treatment segment A is conducted for a duration of no more than 5 minutes, and wherein a heat-treatment C is conducted after the heat-treatment segment B for a duration of no more than 3 minutes.

19. The process according to claim 16, wherein the glazing composition includes a colorant configured to adjust a surface color of the porous dental zirconia article.

20. The process according to claim 16, wherein:
heat-treatment segment A is conducted at a heating rate of 3 to 7 K/sec, and
heat-treatment segment B is conducted at a heating rate of 0.2 to 1.0 K/sec.

* * * * *